United States Patent Office 3,799,904
Patented Mar. 26, 1974

3,799,904
URETHANE RUBBER COMPOSITION
Toyoji Ogasawara and Hideo Yanagisawa, Tokyo, Japan, assignors to Sony Corporation, Tokyo, Japan
No Drawing. Continuation of abandoned application Ser. No. 59,673, July 30, 1970. This application Feb. 28, 1972, Ser. No. 230,096
Int. Cl. C08g 51/50
U.S. Cl. 260—30.6 R                  1 Claim

ABSTRACT OF THE DISCLOSURE

A urethane rubber composition for peroxide vulcanization is shown. It includes a rubber composition having a urethane bond and a phosphoric acid ester plasticizer containing a divalent, trivalent or tetravalent metal.

---

This is a continuation of application Ser. No. 59,673, filed July 30, 1970 now abandoned.

This invention relates to a urethane rubber composition having improved properties, and more particularly to a urethane rubber composition in combination with a novel phosphoric acid ester plasticizer.

Casting type, thermoplastic and radical cross linking type urethane rubbers are well-known as unique rubbers which have excellent mechanical properties such as abrasion resistance and tensile strength as well as ageing resistance, ozone resistance, oil resistance, solvent resistance, etc. Several kinds of radical cross linking type urethane rubbers are available on the market.

However, the available urethane rubbers have a very serious defect in that their mechanical properties vary greatly at low temperature, as compared with other synthetic rubbers such as polybutadiene, butyl rubber, silicone rubber, etc. A rubber comprised of a blend consisting of, for example, 100 parts by weight of a radical cross linking type rubber, 30 parts by weight of carbon black, 3 parts by weight of peroxide and 5 parts by weight of stabilizer and other blending agent, which is cross-linked at a temperature of 150° C. under a pressure of 35 kg./cm.² for 30 minutes, loses its elasticity when cooled down to a temperature of −20° C.

Accordingly, the primary object of this invention is to improve the plasticity, cracking resistance, cold resistance and tear resistance, of vulcanized urethane rubber without impairing its tensile strength, elongation percentage, 100% modulus, permanent elongation, abrasion resistance, ozone resistance and oxidation resistance.

Another object of this invention is to provide a urethane rubber composition containing a plasticizer which achieves the above objects without hindering peroxide vulcanization.

These and other objects of this invention are achieved with a urethane rubber composition for peroxide vulcanization which is comprised of a rubber composition having a urethane bond and a phosphoric acid ester plasticizer containing a divalent, trivalent or tetravalent metal.

The urethane rubber of this invention is cross-linked with a peroxide, for example, diacyl peroxide, ester peroxide, acetal peroxide, dialkyl peroxide, diarylalkyl peroxide, hydrogen peroxide or the like and a cumene derivative is of particular utility for the cross-linking of the urethane rubber. In practice, dicumyl peroxide, t-butyl cumyl peroxide, thymyl cumyl peroxide, methyl cumyl peroxide and the like are employed. Dicumyl peroxide is especially effective for this purpose.

It has heretofore been known in the art to use compounds of the phosphorous ester system, phosphoric acid ester system, phosphorous acid ester system and acid ester phosphate system as plasticizers for urethane rubber. The use of the phosphorous ester, phosphorous acid ester and acid ester phosphate systems of compounds, interferes with radical cross linking by the peroxides, and vulcanized products of less than satisfactory properties are obtained. Accordingly, the compounds of the above three systems cannot be used as plasticizers in urethane rubber compositions for peroxide vulcanization of this invention.

Of the remaining phosphoric acid ester system compounds, those having primary, secondary or tertiary amino radicals interfere with the radical cross-linking, and accordingly, they too cannot be employed as plasticizers in urethane rubber compositions for peroxide vulcanization of this invention.

The phosphoric acid ester system compounds which improve the properties of urethane rubber compositions for peroxide vulcanization and particularly their cold resistance are disclosed in detail in copending U.S. patent application Ser. No. 50,994 filed by the present application on June 29, 1970 and now abandoned.

The compounds which are used as plasticizers of urethane rubber compositions for peroxide vulcanization according to this invention, are phosphoric esters containing divalent, trivalent or tetravalent metals. They are of the following chemical structure: phosphoric acid esters or phosphoric acid diesters, wherein the hydrogen atom of the hydroxyl radical, in the free state, is substituted with a divalent, trivalent or tetravalent metal. When more than two phosphoric acid ester or diester units are combined, the product may be regarded as a salt of the phosphoric acid ester to which they are bonded through the metal atom.

The alcohol groups which constitute the esters of the phosphoric acid are alcohols of alkyl radicals, aryl radicals and alkoxy-alkyl radicals, which have two to eighteen carbon atoms. These radicals may be substituted with halogens, hydroxyl radicals, cyano radicals or glycidyl radicals. The metals in the plasticizer are divalent metals such as zinc, cadmium, lead, copper, nickel, cobalt etc. or trivalent metals such as aluminum or tetravalent metals such as titanium. Divalent metals are preferred.

Zinc salts of phosphoric acid butyl ester are, for example, prepared by first reacting butanol with phosphorus pentoxide, thereby forming a mixture of

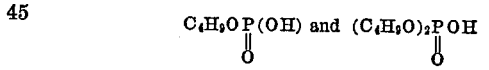

Zinc oxide is then reacted with the mixture of these compounds according to the following reactions:

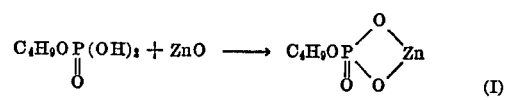

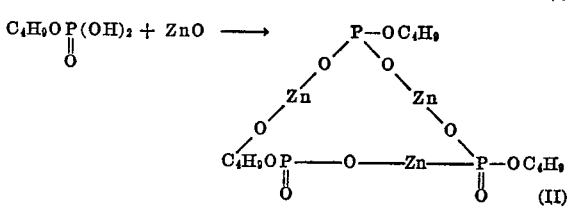

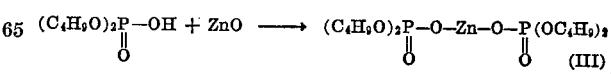

In practice, Compounds I and II are mixed together, so that a more complicated compound may be considered as formed by the reaction of zinc oxide with the monobutyl ester.

A urethane rubber, vulcanized by heating and pressurizing a urethane rubber composition of this invention, has superior qualities as compared with compositions not containing the recited plasticizers, especially in their resistance to cold. This is demonstrated in the following examples.

EXAMPLES I–VII

Seven plasticized rubber compositions according to this invention were prepared as follows. 100 parts by weight of a radical cross linking type urethane rubber, designated as No. 1, No. 2 or No. 3, 30 parts by weight of carbon, 3 parts by weight of carbon, 3 parts by weight of diamyl peroxide, 2 parts by weight of stabilizer and 10 to 20 parts by weight of metal salts of phosphoric acid esters, were milled to make urethane rubber compositions for peroxide vulcanization. Three reference compositions without the salts were similarly prepared. The resulting urethane rubber compositions were vulcanized with a peroxide at a temperature of 150° C. under a pressure of 35 kg./cm.$^2$ for 30 minutes and the properties of the vulcanized product were measured. The measured results are shown in the following table together with those of the reference examples. In the table, the following symbols have the indicated meaning.

$T_B$ = JISK6301 (physical test for vulcanized rubber), tensile strength at break $E_B$ = JISK6301 (physical test for vulcanized rubber), elongation coefficient $T_{100}$ = JISK6301 (physical test for vulcanized rubber), modulus at 100% elongation H = JISK6301 (physical test for vulcanized rubber), hardness PS = Permanent elongation (10 minutes after 100% elongated at 25° C. or —20° C. for 10 minutes and returned to normal condition at the same temperature)

TABLE

| | Ex. I | Ex. II | Ex. III | Ex. IV | Ex. V | Ref. Ex. I | Ex. VI | Ref. Ex. II | Ex. VII | Ref. Ex. III |
|---|---|---|---|---|---|---|---|---|---|---|
| Radical cross linking type urethane rubber No. 1 | | | | | | | 100 | 100 | | |
| Radical cross linking type urethane rubber No. 2 | 100 | 100 | 100 | 100 | 100 | 100 | | | | |
| Radical cross linking type urethane rubber No. 3 | | | | | | | | | 100 | 100 |
| Carbon black | 30 | 30 | 30 | 30 | 30 | 30 | 30 | 30 | 30 | 30 |
| Stearic acid | 0.5 | 0.5 | 0.5 | 0.5 | 0.5 | 0.5 | 0.5 | 0.5 | 0.5 | 0.5 |
| Antioxidant | 2.0 | 2.0 | 2.0 | 2.0 | 2.0 | 2.0 | 2.0 | 2.0 | 2.0 | 2.0 |
| Blending: | | | | | | | | | | |
| Dicumyl peroxide | 3.0 | 3.0 | 3.0 | 3.0 | 3.0 | 3.0 | | | 3.0 | 3.0 |
| 2-ethyl hexyl zinc phosphate | 10 | | | | | | | | 10 | |
| Normal butyl calcium phosphate | | 20 | | | | | | | | |
| 2-ethyl hexyl cadmium phosphate | | | 10 | | | | | | | |
| 2-ethyl hexyl aluminum phosphate | | | | 10 | | | | | | |
| Normal butyl zinc phosphate | | | | | 10 | | 10 | | | |
| Properties: | | | | | | | | | | |
| $T_B$ | 213 | 195 | 221 | 229 | 215 | 260 | 235 | 285 | 180 | 203 |
| $E_B$ | 380 | 410 | 405 | 355 | 360 | 320 | 730 | 710 | 960 | 745 |
| $T_{100}$ | 36 | 34 | 36 | 31 | 34 | 45 | 47 | 62 | 20 | 31 |
| H (25° C.) | 70 | 67 | 69 | 68 | 69 | 72 | 71 | 84 | 45 | 55 |
| H (—20° C.) | 74 | 69 | 72 | 73 | 73 | 79 | 75 | 93 | 49 | 70 |
| PS (25° C.) | 0.8 | 0.6 | 0.6 | 0.7 | 0.5 | 0.6 | 2.0 | 2.0 | 3.1 | 2.5 |
| PS (—20° C.) | 1.2 | 0.9 | 1.0 | 1.0 | 0.8 | 3.0 | 2.9 | 5.0 | 3.6 | 6.0 |

As shown in the above table, the vulcanized products of Examples I–VII have superior characteristics, especially cold resistance, as compared with the vulcanized products of the reference examples.

What is claimed is:

1. A urethane rubber composition for peroxide vulcanization comprised of: a rubber composition containing a radical cross-linking type urethane rubber; and, for each 100 parts by weight of said urethane rubber, approximately 10 to 20 parts by weight of a phosphoric acid ester plasticizer selected from the group consisting of 2-ethyl hexyl zinc phosphate, 2-ethyl hexyl cadmium phosphate, 2-ethyl hexyl aluminum phosphate, normal butyl calcium phosphate and normal butyl zinc phosphate.

References Cited

UNITED STATES PATENTS

| | | | |
|---|---|---|---|
| 3,647,745 | 3/1972 | Jennings | 260—45.7 P |
| 3,257,261 | 6/1966 | Hochberg | 260—45.75 |
| 3,030,334 | 4/1962 | Canarios | 260—45.75 |
| 3,470,222 | 9/1969 | Jennings | 260—429.9 |

OTHER REFERENCES

A. Damusis, "Sealants," published 1967, Reinhold Pub., New York, pp. 144–5, 157–9, 164–5.

MORRIS LIEBMAN, Primary Examiner

P. R. MICHL, Assistant Examiner

UNITED STATES PATENT OFFICE
CERTIFICATE OF CORRECTION

Patent No. 3,799,904                    Dated   March 26, 1974

Inventor(s)   Toyoji Ogasawara and Hideo Yanagisawa

It is certified that error appears in the above-identified patent and that said Letters Patent are hereby corrected as shown below:

In the Heading Insert:

--Priority: August 6, 1969
           Japan
           61677/69--

Signed and sealed this 24th day of December 1974.

(SEAL)
Attest:

McCOY M. GIBSON JR.                C. MARSHALL DANN
Attesting Officer                  Commissioner of Patents